United States Patent [19]

Savage

[11] Patent Number: 4,761,576

[45] Date of Patent: Aug. 2, 1988

[54] MOTOR DRIVEN AIR MOVING APPARATUS FOR HIGH SPEED, CONSTANT DUTY OPERATION

[75] Inventor: Jack W. Savage, Centerville, Ohio

[73] Assignee: General Motors Corporation, Detroit, Mich.

[21] Appl. No.: 943,342

[22] Filed: Dec. 19, 1986

Related U.S. Application Data

[63] Continuation-in-part of Ser. No. 797,218, Nov. 12, 1985, abandoned.

[51] Int. Cl.⁴ ............................................. H02K 5/24
[52] U.S. Cl. ...................................... 310/51; 310/179; 310/216
[58] Field of Search ............... 310/179, 51, 185, 187, 310/188, 261, 265, 264, 269, 267, 216, 217, 218, 195, 67 R, 62, 59, 63, 68 R, 156, 46, 157, 177, 154, 259; 74/574

[56] References Cited

U.S. PATENT DOCUMENTS

| | | | |
|---|---|---|---|
| 550,692 | 12/1895 | Reist . | |
| 606,912 | 7/1898 | Blathy et al. . | |
| 1,803,493 | 5/1931 | Volet . | |
| 2,012,021 | 8/1935 | Peterson | 22/203 |
| 2,698,910 | 3/1952 | Blyth | 310/51 |
| 2,993,131 | 7/1961 | Trevitt | 310/86 |
| 3,253,170 | 5/1966 | Phillips et al. | 310/168 |
| 3,577,851 | 5/1971 | Detheridge | 29/596 |
| 3,842,493 | 10/1974 | Ohuchi et al. | 29/596 |
| 4,385,250 | 5/1983 | Welburn | 310/162 |
| 4,423,343 | 12/1983 | Field, II | 310/49 R |
| 4,583,015 | 4/1986 | Toshimitsu | 310/187 |
| 4,613,780 | 9/1986 | Fritzsche | 310/216 |
| 4,659,951 | 4/1987 | Angi et al. | 310/62 |

FOREIGN PATENT DOCUMENTS

| | | | |
|---|---|---|---|
| 0182702 | 5/1986 | European Pat. Off. | 310/46 |
| 58-119754A | 7/1983 | Japan | 216/ |
| 58-116031A | 7/1983 | Japan | 310/216 |
| 7805766 | 11/1978 | Netherlands | 310/261 |

Primary Examiner—R. Skudy
Attorney, Agent, or Firm—Robert M. Sigler

[57] ABSTRACT

A motor driven air moving apparatus adapted to high speed, constant duty operation has a DC permanent magnet motor with a stator and rotor, one having a wound core with an even number of identically sized, evenly spaced teeth and the other having an even number of identically sized, permanent magnet poles. One of the rotor and stator has a skew at an angle from the axial, the maximum achievable skew being less than one tooth pitch due to short axial core width. A groove is provided along the midline of each of the teeth of the core which is parallel to and shallower than the tooth separating slots and contains no winding. The groove is effective to divide the tooth magnetically in half and thus decrease the effective tooth pitch, whereby, simultaneously, the magnetically induced pulsating angular velocity of the rotor and resultant audible noise are reduced and the system efficiency of the motor and air moving apparatus combination at high speeds in constant duty operation is increased.

2 Claims, 2 Drawing Sheets

FRACTIONAL SKEW AND NO NOTCH

SAME SKEW WITH NOTCH

TORQUE VARIATION

ROTATION ANGLE

MOTOR DRIVEN AIR MOVING APPARATUS FOR HIGH SPEED, CONSTANT DUTY OPERATION

BACKGROUND OF THE INVENTION

This patent application is a continuation-in-part of U.S. Ser. No. 797,218 now abandoned, filed Nov. 12, 1985 and assigned to the assignee of this application.

This invention relates to motor driven air moving apparatus such as a fan or blower adapted to high speed, constant duty operation and having a DC permanent magnet driving motor with a stator and rotor, one of which has a core with teeth separated by winding containing slots and the other of which has permanent magnet poles. It further relates to such a motor in which one of the rotor and stator has its pole magnetization or teeth skewed from the axial with a skew angle embodying a low ratio of axial core width to tooth pitch.

The type of motor used in this apparatus is subjected to magnetically induced pulsations in torque due to non-uniform air gap reluctance as successive teeth and field poles pass in relative rotation, which torque pulsations tend to alternately accelerate and decelerate the angular velocity of whichever of the armature or field assembly is rotating. The resulting pulsating angular velocity is one factor contributing to noise in the operation of the machine. The skew is intended to reduce this magnetically induced angular speed fluctuation and its resulting noise. The optimum skew angle has a tangent equal to at least one tooth pitch divided by the armature core or stack width, where the tooth pitch is the total circumferential distance from the beginning of one slot to the beginning of the next slot. With this skew angle there is always a constant portion of core tooth adjacent the field poles; and the torque pulsations are reduced due to uniform air gap reluctance.

However, for an armature having a short stack width compared to its tooth pitch, the resulting optimum angle is often too great for practical manufacturing. The great angle results in narrowed effective slots with little room for armature windings. The sharp angled corners of the armature core may cut the insulation and perhaps even the wire of the windings wrapped around them. It is more difficult to bend the wire around the sharp corners, which results in increased end bulk and reduced efficiency. Thus, such axially short armatures are manufactured with a compromise skew angle significantly smaller than optimum, with resulting susceptibility to noise producing angular velocity pulsations. However, such axially short armatures offer certain other advantages in particular applications, such as low weight and profile and, in some cases, lower cost for high efficiency. Therefore, their use is highly desirable in some cases; and a construction effective to reduce the noise is sought.

SUMMARY OF THE INVENTION

The object of this invention is therefore to provide a motor driven air moving apparatus as described above with reduced noise from magnetically induced pulsating angular rotor velocity in motor operation.

This object is realized in such apparatus including a motor in which a groove is disposed along the midline of each of the teeth of the core, which groove is parallel to and shallower than the tooth separating slots and contains no winding, the groove being effective to divide the tooth magnetically in half, circumferentially, and thus decrease the effective tooth pitch. It is found that, with a compromise skew angle, this groove reduces the magnetically induced pulsating angular velocity of the rotor and resultant audible noise.

However, it is further found that this groove changes the speed-torque curve of the motor to improve the efficiency of the motor and blower system at high speeds in constant duty operation. This additional benefit is of particular value in motors for air moving applications such as blowers and fans, which are adapted for constant duty at high speed where the fluid backpressure is greatest and wherein stall or breakaway torque is of no great importance.

Further details and advantages of this invention will be apparent from the accompanying drawings and following description of a preferred embodiment.

DESCRIPTION OF THE PREFERRED EMBODIMENT

Figure 7:
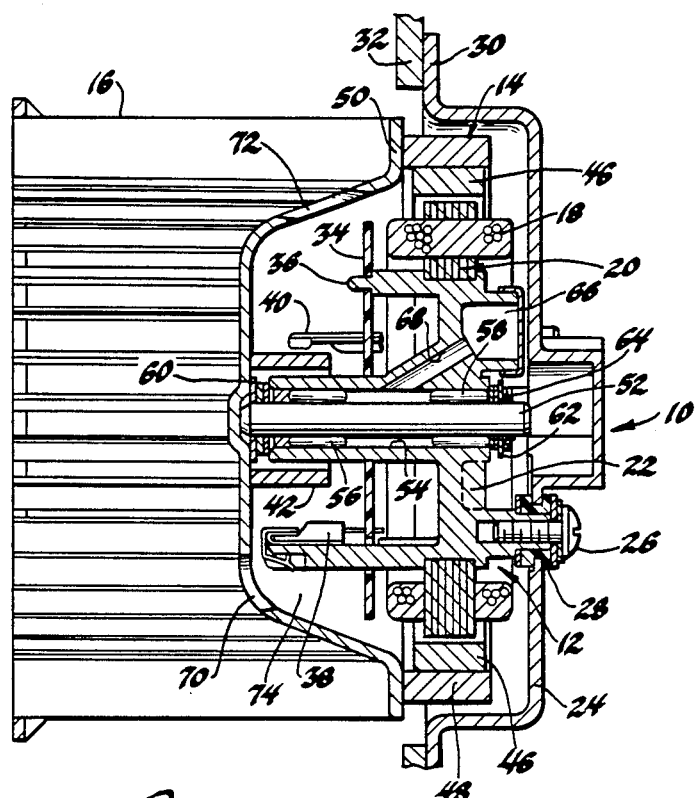
FIG. 7 is an axial cutaway view of motor driven air moving apparatus including a stator as shown in FIG. 1.

Referring first to FIG. 7, reference numeral 10 generally designates a brushless DC motor comprising a stator assembly 12 located at the center of the motor and an annular rotor assembly 14 disposed thereabout. A squirrel cage blower 16 is secured to rotor assembly 14 and adapted to be rotatably driven thereby.

Stator assembly 12 comprises a winding set 18 and laminated stator core 20 mounted on a support member 22. Support member 22, in turn, is mounted on a stator housing 24 by a plurality of screw fasteners 26. Elastomeric grommets 28 separate stator housing 24 from support member 22 for noise isolation. Stator housing 24 includes a peripheral flange 30 for securing motor 10 to a stationary support member 32.

Figure 1:
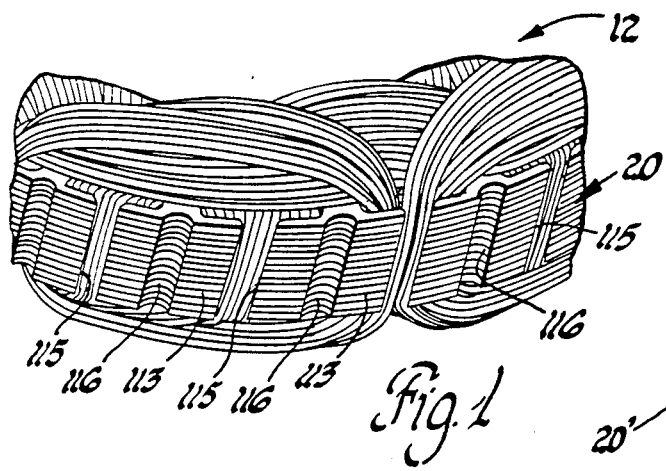
FIG. 1 is a perspective view of a representative portion of a stator in motor driven air moving apparatus according to the invention.

Winding set 18 of stator assembly 12 is electronically commutated by a control circuit, the electronic components of which are mounted on an annular circuit board 34. Circuit board 34 is mounted on the posts 36 of support member 22 in spaced relation to winding set 18. In practice, electronic components are mounted on both sides of circuit board 34, permitting the entire control circuit to be included thereon. However, FIG. 1 depicts only power transistors 38 and Hall Effect devices 40. Power transistors 38 are strapped to support member 22, which acts as a heat sink therefor. Hall Effect devices 40 are positioned in relation to a phasing magnet 42 which rotates with rotor assembly 14 as described below.

Rotor assembly 14 comprises an even number of evenly spaced, radially magnetized permanent magnets 46 secured to the inner periphery of a rotor flux ring 48, and axially aligned with stator core 20. Rotor flux ring 48 is secured to a rotor cup member 50, which in turn, supports blower 16. Rotor cup member 50 is secured to a rotor shaft 52, which is received within a recess 54 of support member 22 and rotatably supported therein by press-fit bearings 56 and 58. Thrust bearing washers 60 and 62 are retained at either end of support member 22 by a retainer ring 64. A lubricant reservoir 66 defined by a recess in the support member 22 supplies lubricating fluid to rotor shaft 52 and bearings 56 and 58 via a drilled passage 68 and recess 54. Phasing magnet 42 is secured to rotor cup member 50 as indicated above and serves in conjunction with Hall Effect devices 40 to supply the control circuit with information concerning the position of rotor assembly 14.

The primary function of rotor cup member 50 is to cover and protect the electronic components mounted on circuit board 34 from damage due to manufacturing handling or foreign matter picked up by blower 16. In this embodiment, however, rotor cup member 50 is provided with at least one pair of radially displaced openings 70 and 72, which serve the advantageous function of providing a source of cooling air for the circuit board electronic components, as described in the U.S. patent application Ser. No. 829,488, Brushless Blower Motor With Load Proportional Cooling For Control Circuitry, filed on Feb. 14, 1986 by Donald F. Angi et al and issued on Apr. 21, 1987 as U.S. Pat. No. 4,659,951.

Figure 4:
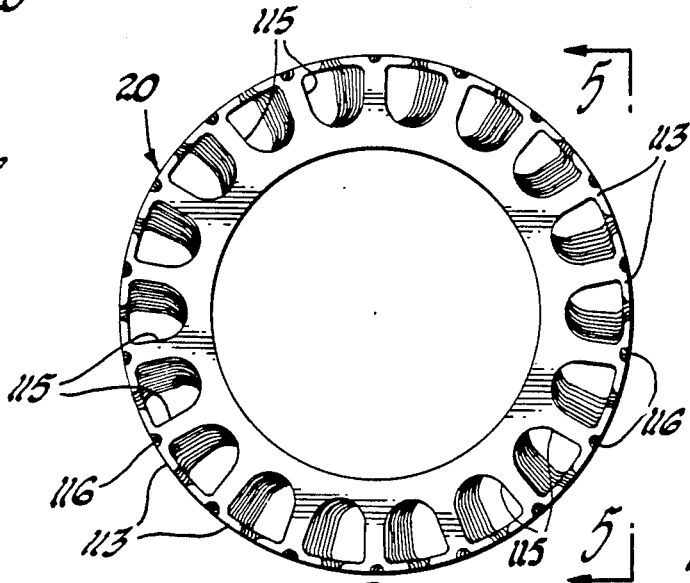
FIG. 4 is an axial view of the core used in the stator of FIG. 1.
Figure 5:
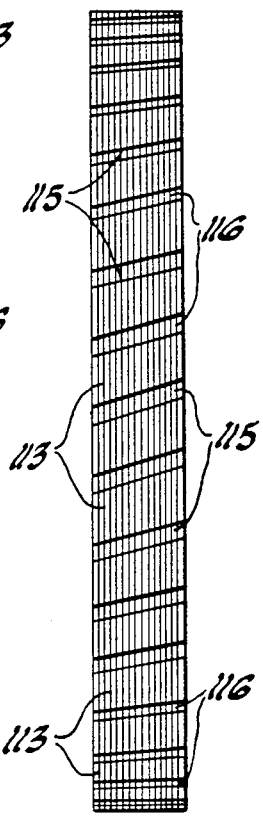
FIG. 5 is an end view of the core shown in FIG. 4.

Referring to FIGS. 1, 4 and 5, core 20 of stator assembly 12 is constructed in the usual manner of stacked laminations of iron; and each lamination is identically shaped to produce in the assembled core an even number of identical teeth 113 separated by slots 115. Both the stator and rotor have an even number of teeth with even circumferential spacing to prevent unbalanced radial magnetic forces from creating undue bearing wear and rattling of the rotor in rotation. The windings of winding set 18 are formed by wire wrapped around selected teeth in the slots in the normal manner. In assembly, each consecutive lamination is rotated slightly about the common axis so that the teeth and slots have a skew relative to the axis. This skew is provided to reduce the torque pulsations caused by variations in magnetic forces due to non-uniform air gap reluctance as the permanent magnet armature poles pass teeth 113 during relative rotation of the armature and stator assemblies in the operation of the assembled machine. The skew is less than one tooth pitch due to the short stack or axial core width. This skew angle, as previously discussed, is not optimal for motor quieting.

Figure 2:
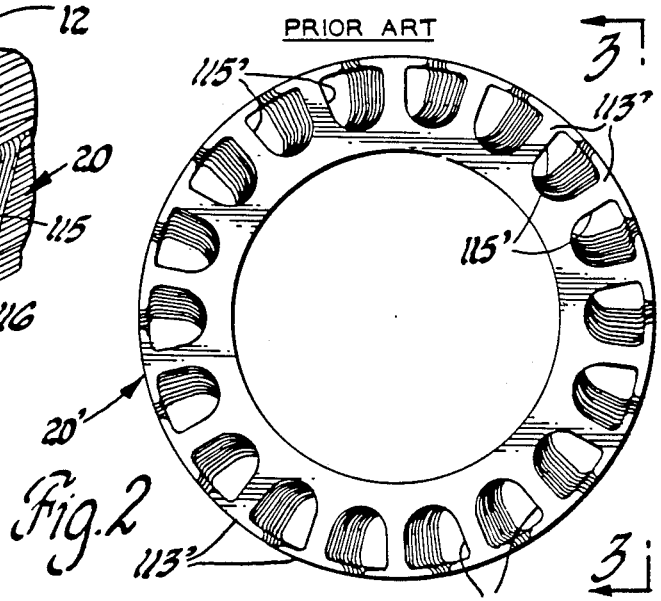
FIG. 2 is an axial view of the core of a prior art stator having a short axial core width.
Figure 3:
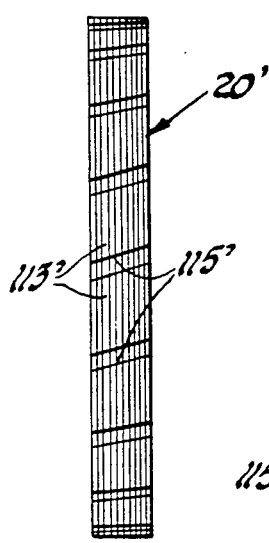
FIG. 3 is an end view of the prior art stator core shown in FIG. 2.
Figure 6:
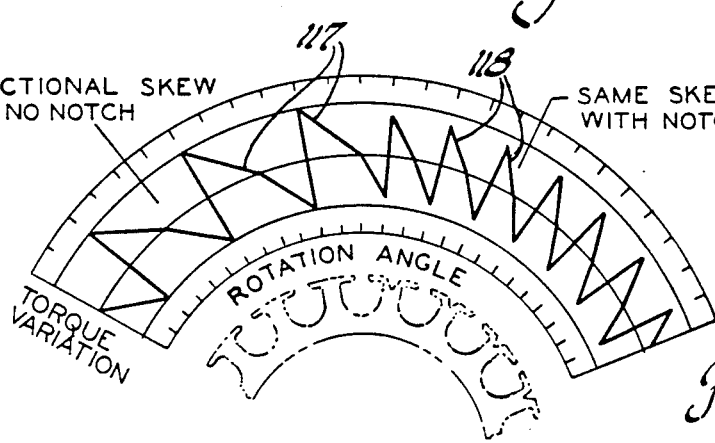
FIG. 6 is a graph showing the torque pulsations produced by relative rotation of rotor and stator in motors containing cores as shown in FIGS. 2 and 4.

A conventional prior art core is shown in FIGS. 2 and 3 with similar but primed reference numerals. The core of the invention, shown in FIGS. 4 and 5, is identical with the conventional core with the following exception. Each tooth 113 is provided with a groove 116 on its outer circumferential surface which exhibits the same skew as the tooth itself. This groove is placed in substantially the center of the tooth. It is shown as being of semicircular cross section, although it is not so limited and may be, for example, of triangular cross section as shown in FIG. 6. It is of sufficient width and depth to greatly increase the reluctance of the air gap therethrough and thus effectively divide the tooth in half, magnetically as well as physically. As the two separated halves of each tooth 113 and the field poles pass each other, the magnetic flux variation is changed from that of an undivided single tooth. The difference is shown in FIG. 6, wherein the torque variation during rotation is shown in curves 117 and 118 in circular coordinates, the torque variation being shown in the radial direction and rotational angle in the circular direction. The type of tooth is graphically illustrated below the torque curve, with curve 117 corresponding to the prior art with no grooves and curve 118 corresponding to grooved teeth. It can be seen that the variation is smaller in magnitude and characterized by a higher frequency for the core with grooved teeth. With the higher frequency and a significant rotational inertia in the rotating member, the amplitude of each change in rotational velocity has less time to build up and thus provides a smaller average noise amplitude. Also, the higher frequency of the noise makes it easier to filter out by isolation mounting.

It has been stated that the skew of the teeth is an essential element of this invention. However, it is not essential that the skew be provided to the teeth and grooves. Teeth 113 including grooves 116 may alternatively be straight axial teeth separated by axial slots, provided that the opposing permanent magnets are skewed. It also makes no difference which of the wound teeth and permanent magnets rotate and which is stationary. The short axial length, relative to the skew angle, of course applies to either of the stator and rotor, since their effective interaction is, for all practical purposes, confined to the axial length of the axially shortest. Therefore, although only one embodiment is shown, the invention may apply to motor driven air moving apparatus including any combination of stator and rotor provided that one includes teeth separated by slots and the other has permanent magnets, one is skewed from the axial, the axial length of the interacting portions of the teeth of stator and rotor are short relative to the skew, and the teeth include grooves as described above along their midline parallel to the pole separating slots.

Figure 8:
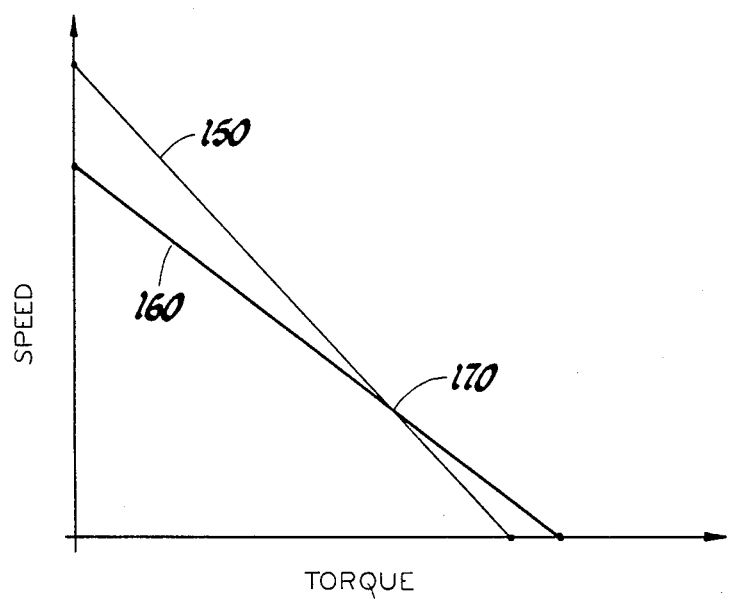
FIG. 8 is a graph showing speed-torque curves for the motor driven air moving apparatus of this invention and prior art apparatus.

There is an additional, unanticipated benefit of grooves 116 in the air moving apparatus of FIG. 1. It has been found that the torque-speed curve of the motor is changed as shown in the curves of FIG. 8. As shown in that Figure, curve 150, which represents the torque-speed relationship for the blower motor of FIG. 1 with grooves 116, has a different slope than curve 160, which represents the torque-speed relationship of a similar prior art blower motor without such grooves. The two curves cross at a point 170. In the region to the left of point 170, which is the high speed, lower torque region in which a constant duty motor such as a blower or fan motor generally operates, curve 150 of the invention shows a higher torque than curve 160.

This translates into a greater air moving system efficiency during normal motor operation, where efficiency is defined as the mechanical air power output divided by the electrical power input to the motor. Tests have shown, for example, that a blower motor according to this invention, operated at an air delivery rate of 7.03 m$^3$/min with a current of 14.7 amps for a system efficiency of 34.2%, whereas a prior art motor not including the grooves but similar in every other way operated at an air delivery rate of 6.23 m$^3$/min with a current of 13.45 amps for a system efficiency of 33.1%. For the same current level of 14.0 amps, the motor of this invention operated at an air delivery rate of 6.35 m$^3$/min and generated an output air pressure differential of 0.635 kPa for a system efficiency of 34.3%, whereas the prior art motor operated at an air delivery rate of 6.82 m³/min and a generated output pressure differential of 0.570 kPa for a system efficiency of 33.1%. The price to be paid, as FIG. 8 shows, is a lower stall torque; however, motors in this type of application generally have no problem with stall torque. In particular, a blower or fan motor has excess stall torque, since it has practically no air resistance at start; and some of this excess stall torque may easily be traded for greater efficiency at higher speeds, where the air or fluid backpressure is much greater.

Thus the invention provides simultaneously a reduction in noise due to torque fluctuations between stator and rotor tending to produce rotational speed fluctuations and an improvement in system efficiency for constant duty, high speed air moving operation.

The embodiments of the invention in which an exclusive property or privilege is claimed are defined as follows:

1. In DC permanent magnet motor driven air moving apparatus, the motor having a stator and rotor, one of the stator and rotor having a core with an even number of identically sized, evenly spaced skewed teeth separated by winding containing slots and the other of the stator and rotor comprising an even number of identically sized, permanent magnet poles, one of the rotor and stator having a skew at an angle from the axial, the maximum achievable skew being less than one tooth pitch due to short axial core width, which tends to produce a magnetically induced pulsating angular velocity of rotor with audible noise, the improvement comprising:

a skewed groove along the midline of each of the teeth of the core which is parallel to and shallower than the tooth separating slots and contains no winding, the skewed groove being effective to divide the tooth magnetically in half, circumferentially, and thus decrease the effective tooth pitch, whereby, simultaneously, the magnetically induced pulsating angular velocity of the rotor and resultant audible noise are reduced and efficiency of the motor and air moving apparatus combination at high speeds in constant duty operation is increased.

2. The improved motor driven air moving apparatus of claim 1 in which the rotor includes a shaft which directly turns a blower and the motor has a speed/torque relationship for air moving operation characterized by higher speeds in the high speed, lower torque region of operation.

* * * * *